(12) United States Patent
Kim et al.

(10) Patent No.: US 10,936,891 B2
(45) Date of Patent: Mar. 2, 2021

(54) ELECTRONIC DEVICES AND METHODS OF OPERATING ELECTRONIC DEVICES

(71) Applicant: SAMSUNG ELECTRONICS CO., LTD., Suwon-si (KR)

(72) Inventors: Chol-Min Kim, Changwon-si (KR); Tae-Kyeong Ko, Hwaseong-si (KR); Ji-Yong Lee, Anyang-si (KR); Deok-Ho Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 16/295,526

(22) Filed: Mar. 7, 2019

(65) Prior Publication Data

US 2020/0074202 A1 Mar. 5, 2020

(30) Foreign Application Priority Data

Aug. 29, 2018 (KR) ........................ 10-2018-0102183

(51) Int. Cl.
| | | |
|---|---|---|
| *G06K 9/00* | (2006.01) | |
| *G06K 9/62* | (2006.01) | |
| *G06T 1/20* | (2006.01) | |
| *G06N 3/08* | (2006.01) | |
| *G06T 1/60* | (2006.01) | |

(52) U.S. Cl.
CPC ..... *G06K 9/00986* (2013.01); *G06K 9/00979* (2013.01); *G06K 9/6261* (2013.01); *G06K 9/6288* (2013.01); *G06N 3/08* (2013.01); *G06T 1/20* (2013.01); *G06T 1/60* (2013.01)

(58) Field of Classification Search
CPC ............. G06K 9/00986; G06K 9/6288; G06K 9/00979; G06K 9/6261; G06T 1/20; G06T 1/60; G06N 3/063; G06N 3/084; G06N 3/0454; G06N 3/08
See application file for complete search history.

(56) References Cited

U.S. PATENT DOCUMENTS

| | | | |
|---|---|---|---|
| 7,734,117 B2 | 6/2010 | Tannhof et al. | |
| 8,391,306 B2 | 3/2013 | Ito et al. | |
| 9,195,934 B1 * | 11/2015 | Hunt | ........................ G06N 3/02 |
| 9,754,221 B1 | 9/2017 | Nagaraja | |
| 9,836,277 B2 | 12/2017 | Guz et al. | |
| 2016/0162779 A1 * | 6/2016 | Marcus | ................. G06N 20/00 |
| | | | 706/12 |

(Continued)

*Primary Examiner* — Carol Wang
(74) *Attorney, Agent, or Firm* — Lee IP Law, PC

(57) ABSTRACT

An electronic device includes a graphic processor and a memory device. The graphic processor includes an artificial neural network engine that makes an object recognition model learn by using learning data and weights to provide a learned object recognition model. The memory device, divides a feature vector into a first sub feature vector and a second feature vector, and performs a first calculation to apply the second sub feature vector and the weights to the learned object recognition model to provide a second object recognition result. The artificial neural network engine performs a second calculation to apply the first sub feature vector and the weights to the learned object recognition model to provide a first object recognition result and provides the first object recognition result to the memory device. The second calculation is performed in parallel with the first calculation.

20 Claims, 18 Drawing Sheets

(56) References Cited

U.S. PATENT DOCUMENTS

2017/0147608 A1    5/2017  Zhang
2017/0316312 A1*  11/2017  Goyal ........................ G06F 7/48
2018/0081583 A1    3/2018  Breternitz et al.
2018/0157969 A1*  6/2018  Xie ......................... G06N 3/063
2020/0117700 A1*  4/2020  Chatterjee ................ G06N 3/08

* cited by examiner

| 0 | 1 | 1 | 1 | 0 | 0 | 0 |
|---|---|---|---|---|---|---|
| 0 | 0 | 1 | 1 | 1 | 0 | 0 |
| 0 | 0 | 0 | 1 | 1 | 1 | 0 |
| 0 | 0 | 0 | 1 | 1 | 0 | 0 |
| 0 | 0 | 1 | 1 | 0 | 0 | 0 |
| 0 | 1 | 1 | 0 | 0 | 0 | 0 |
| 1 | 1 | 0 | 0 | 0 | 0 | 0 |

SFV1 — SFV2

KRN1

| 1 | 0 | 1 |
|---|---|---|
| 0 | 1 | 0 |
| 1 | 0 | 1 |

ELECTRONIC DEVICES AND METHODS OF OPERATING ELECTRONIC DEVICES

CROSS-REFERENCE TO RELATED APPLICATION

Korean Patent Application No. 10-2018-0102183, filed on Aug. 29, 2018, in the Korean Intellectual Property Office, and entitled: "Electronic Devices and Methods of Operating Electronic Devices," is incorporated by reference herein in its entirety.

BACKGROUND

1. Field

Example embodiments relate generally to artificial intelligence, and more particularly to electronic devices and methods of operating electronic devices capable of enhancing performance.

2. Description of the Related Art

With development of information devices such as a computer and a smartphone, digital computer application and digital signal processing technologies have been developed.

In particular, recent technologies such as artificial intelligence image recognition (video/motion recognition), deep learning (deep learning), and machine learning have been developed, and intelligent service that automatically recognizes data such as voice, image, video, or text and provides information related to data or provide services related to data is used in various fields. Additionally, edge devices are starting to use of artificial intelligence.

SUMMARY

According to example embodiments, an electronic device includes a graphic processor and a memory device. The graphic processor includes an artificial neural network engine that makes an object recognition model learn by using learning data and weights to provide a learned object recognition model. The memory device stores the learning data and the weights, divides a feature vector into a first sub feature vector and a second feature vector to provide the first sub feature vector to the graphic processor, receives the learned object recognition model from the graphic processor, and performs a first calculation to apply the second sub feature vector and the weights to the learned object recognition model to provide a second object recognition result. The feature vector is extracted from an input data. The artificial neural network engine performs a second calculation to apply the first sub feature vector and the weights to the learned object recognition model to provide a first object recognition result and provides the first object recognition result to the memory device. The second calculation is performed in parallel with the first calculation.

According to example embodiments, an electronic device an application processor, a graphic processor and a memory device. The application processor provides a learning data and weights, and provides a feature vector extracted from object data constituting an object. The graphic processor includes an artificial neural network engine that makes an object recognition model learn by using the learning data and the weights to provide a learned object recognition model. The memory device stores the learning data and the weights, divides a feature vector into a first sub feature vector and a second feature vector to provide the first sub feature vector to the graphic processor, receives the learned object recognition model from the graphic processor, and performs a first calculation to apply the second sub feature vector and the weights to the learned object recognition model to provide a second object recognition result. The feature vector is extracted from an input data. The artificial neural network engine performs a second calculation to apply the first sub feature vector and the weights to the learned object recognition model to provide a first object recognition result and provides the first object recognition result to the memory device. The second calculation is performed in parallel with the first calculation.

According to example embodiments, in a method of operating an electronic device that includes a graphic processor including an artificial neural network engine, and a memory device communicating with the graphic processor, an object recognition model is made to learn by the artificial neural network engine, by applying learning data and weights to the object recognition model to provide a learned object recognition model. A feature vector associated with an input data is divided, by a data distributor in the memory device, into a first sub feature vector and a second feature vector to provide the first sub feature vector to the graphic processor. A first calculation to apply the second sub feature vector and the weights to the learned object recognition model is performed by a multiplication and accumulation (MAC) circuit in the memory device, model to provide a second object recognition result. A second calculation to apply the first sub feature vector and the weights to the learned object recognition model, is performed by the artificial neural network engine, to provide a first object recognition result. The first object recognition result and the second object recognition result are merged by a pooler in the memory device to provide a merged object recognition result to a user. The first calculation and the second calculation are performed in parallel with each other.

BRIEF DESCRIPTION OF THE DRAWINGS

Features will become apparent to those of skill in the art by describing in detail exemplary embodiments with reference to the attached drawings in which:

FIG. 13 illustrates a kernel associated with the feature vector and the weights of the PIM circuit of FIG. 9.

DETAILED DESCRIPTION

Example embodiments will be described more fully hereinafter with reference to the accompanying drawings.

An artificial intelligence system is a computer system that implements human-level intelligence, and unlike the existing rule-based smart systems, a machine learns, judges, and becomes smart. The more the artificial intelligence systems are used, the recognition capabilities of the system are further improved and user preferences are more accurately identified. Thus, existing rule-based smart systems are increasingly being replaced by deep-learning-based artificial intelligence systems.

Artificial intelligence technology is composed of machine learning (e.g., deep learning) and element technology utilizing machine learning. Machine learning is an algorithm technology that classifies/learns the characteristics of input data by itself. Element technology is technology that simulates functions, e.g., recognition, judgment, and so forth, of the human brain using a machine learning algorithm, e.g., deep learning, which learns data representation as opposed to task specific algorithms. The element technology includes linguistic understanding, visual understanding, reasoning/prediction, knowledge representation, and motion control.

Numerous fields apply which artificial intelligence technology. For example, linguistic understanding is a technology for recognizing, applying, and processing human language/characters, including natural language processing, machine translation, dialogue system, question and answer, speech recognition/synthesis, and the like. Visual understanding is a technology to recognize and process objects mimicking human vision, including object recognition, object tracking, image search, human recognition, scene understanding, spatial understanding, image enhancement, and the like. Reasoning and prediction are a technology for judging information, and logically inferring and predicting information, including knowledge/probability based reasoning, optimization prediction, preference-based planning, and recommendation. Knowledge representation is a technology for automating human experience information into knowledge data, including knowledge building (data generation/classification) and knowledge management (data utilization). Motion control is a technology for controlling the autonomous travel of a vehicle and the motion of a robot, and includes motion control (navigation, collision, traveling), operation control (behavior control).

Figure 1:
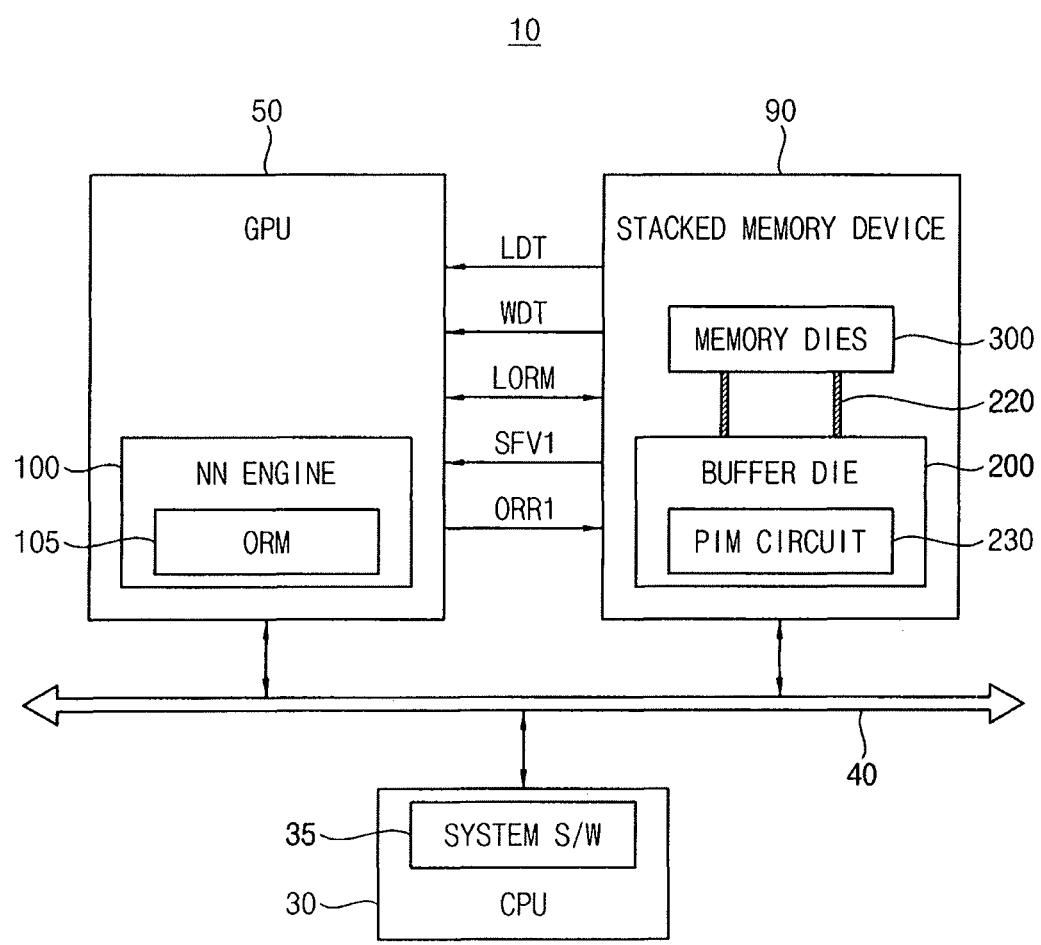
FIG. 1 illustrates an electronic device capable of performing artificial intelligent operation in parallel, according to example embodiments.

FIG. 1 illustrates an electronic device capable of performing artificial intelligent operation in parallel, according to example embodiments. Referring to FIG. 1, an electronic device 10 may include a central processing unit (CPU) 30, a graphic processor (GPU) 50 and a stacked memory device 90. The CPU 30, the GPU 50, and the stacked memory device 90 may communicate with one another through a bus 40.

The stacked memory device 90 may include a buffer die 200 and a plurality of memory dies 300 stacked on the buffer die 200. The buffer die 200 and the memory dies 300 may be sequentially stacked on each other. The memory dies 300 stacked on the buffer die 200 may be electrically connected to the buffer die 200 by conductors. The conductors may be one or more through silicon via (TSV)s 220. The stacked memory device 90 may store learning data LDT and weights WDT, and may provide the GPU 50 with the learning data LDT and the weights WDT.

The GPU 50 may include an artificial neural network (ANN) engine 100. The ANN engine 100 receives the learning data LDT and the weights WDT from the stacked memory device 90, makes an object recognition model (ORM) 105 learn by using the learning data LDT and the weights WDT, and provides a learned object recognition model LORM to the stacked memory device 90.

The ANN engine 100 and at least some portion of the stacked memory device 90 may constitute an object recognition device. At least some portion of an object recognition device may be implemented as a software module or a hardware chip and may be provided in various electronic devices. For example, the object recognition device may be fabricated in the form of a hardware chip exclusive for artificial intelligence (AI), or a conventional general purpose processor (e.g., a CPU or an application processor) or a graphics-only processor, and may be mounted on the various electronic devices. At this time, the hardware chip exclusive for artificial intelligence is a dedicated processor for probability calculation, and has higher parallel processing performance than a conventional general processor, thus enabling rapid computing works in the machine learning and artificial intelligence field.

When the object recognition device is implemented as a software module (or a program module including an instruction), the software module may be stored in a non-transitory, computer-readable media. Further, in this case, at least one software module may be provided by an operating system (OS) or by a predetermined application. Alternatively, some of the software modules may be provided by an operating system (OS), and some of the software modules may be provided by a predetermined application.

The object recognition model 105 may include a neural network model or a deep learning model which performs computing based on connection relationship among a plurality of network nodes and the selected weights of a portion of the plurality of network nodes. The object recognition model 105 may be designed to simulate the human brain structure on a computer. The object recognition model 105 may include a plurality of network nodes having weights (weighted values) that simulate a neuron of a human neural network. The plurality of network nodes may respectively establish a connection relationship so that the neurons simulate synaptic activity of sending and receiving signals via synapses.

The object recognition model 105 may, e.g., include a neural network model or a deep learning model developed from a neural network model. In the deep learning model, a plurality of network nodes are located at different depths (or layers), and data can be exchanged according to a convolution connection relationship. The deep learning model may include, e.g., deep neural networks (DNN), recurrent neural networks (RNN), bidirectional recurrent deep neural network (BRDNN), and the like.

The ANN engine 100 receives a first sub feature vector SFV1 associated with the input data from the stacked memory device 90, and performs a second calculation to apply the first sub feature vector SFV1 and the weights WDT to the learned object recognition model LORM to provide a first object recognition result ORR1 to the stacked memory device 90. The stacked memory device 90 performs a first calculation to apply a second sub feature vector SFV2 and the weights WDT to the learned object recognition model LORM to provide a second object recognition result. The stacked memory device 90 performs the first calculation and the ANN engine 100 performs the second calculation in parallel.

The buffer die 200 may include a process-in memory (PIM) circuit 230 that divides the input data or a feature vector extracted from the input data into the first sub feature vector SFV1 and the second sub feature vector SFV2, provides the first sub feature vector SFV1 to the ANN engine 100, and performs the first calculation on the second sub feature vector SFV2.

The CPU 30 may include system software 35 that controls the PIM circuit 230. The CPU 30 may serve as a host and may be, e.g., a general purpose processor, such as a microprocessor, array processors, multi-core processors, an application specific integrated circuit (ASIC), a digital signal processor (DSP), and the like.

Figure 2:
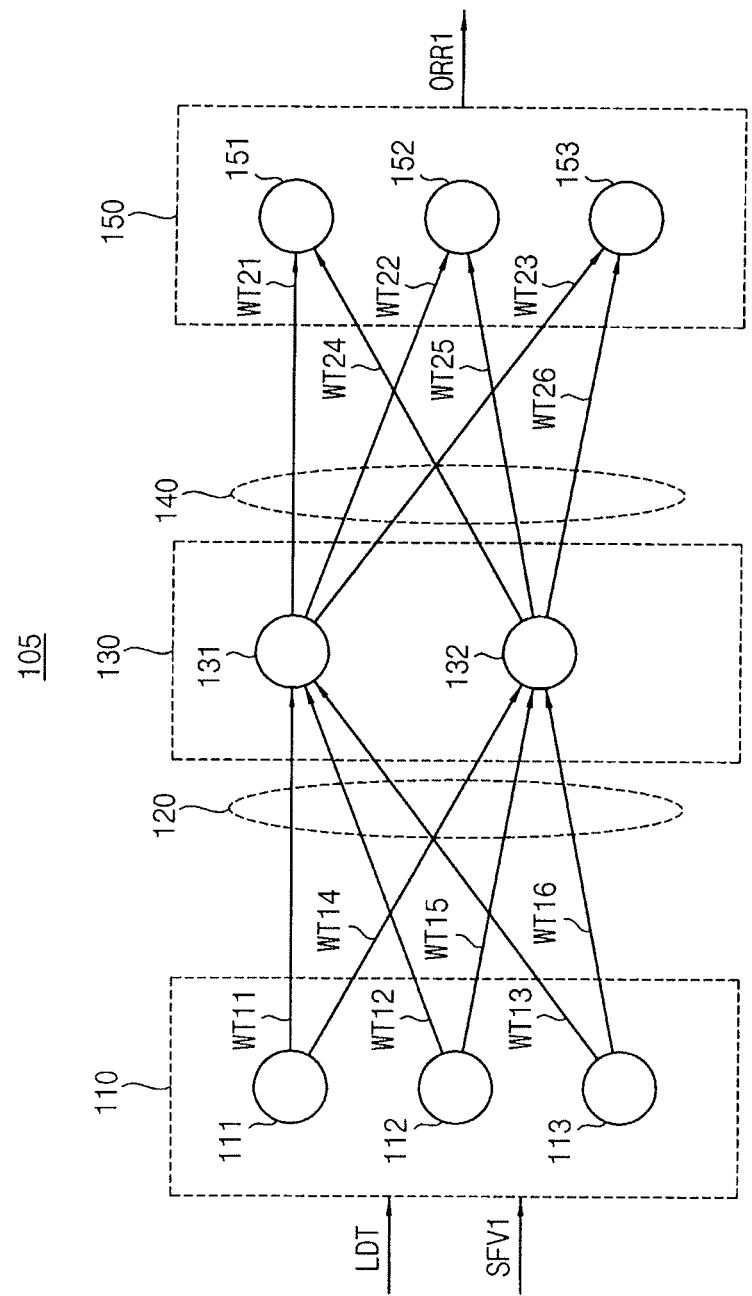
FIG. 2 illustrates the object recognition model in FIG. 1 according to example embodiments.

FIG. 2 illustrates the object recognition model 105 in FIG. 1 according to example embodiments. Referring to FIG. 2, the object recognition model 105 may include an input layer 110, a hidden layer 130, an output layer 150, first connection lines 120, and second connection lines 140.

The input layer 110 may include input nodes 111, 112, and 113. The hidden layer 130 may include hidden nodes 131 and 132. The output layer 150 may include output nodes 151, 152, and 153.

The input nodes 111, 112, and 113 in the input layer 110 receive the learning data LDT or the first sub feature vector SFV1, and transfer the learning data LDT or the first sub feature vector SFV1 to the hidden layer 130 through the first connection lines 120 having first weights WT11~WT16.

The hidden nodes 131 and 132 in the hidden layer 130 receive the learning data LDT or the first sub feature vector SFV1, perform computing on learning data LDT or the first sub feature vector SFV1, and transfer a result of the computing to the output layer 150 through the second connection lines 140 having second weights WT21~WT26.

The output nodes 151, 152, and 153 in the output layer 150 receive values from the hidden layer 130, perform computing on the values, and output a first object recognition result ORR1 corresponding to the learning data LDT or the first sub feature vector SFV1.

The first weights WT11~WT16 and the second weights WT21~WT26 may be referred to as connection weights or connection strengths.

The object recognition model 105 may include a plurality of hidden layers. A neural network including a plurality of hidden layers may be referred to as a deep neural network. Training the deep neural network may be referred to as deep learning.

Assuming that the plurality of hidden layers includes a first hidden layer, a second hidden layer, and a third hidden layer, an output of a hidden node in the first hidden layer may be connected to hidden nodes in the second hidden layer, and an output of a hidden node in the second hidden layer may be connected to hidden nodes in to the third hidden layer. For example, the object recognition model 105 may input outputs of previous hidden nodes in a previous hidden layer into each hidden layer through edges having connection weights, and may generate outputs of hidden nodes in a hidden layer based on values obtained by applying the connection weights to the outputs of the previous hidden nodes and activation functions.

To connect or generate and transmit a signal output to a next hidden node, a result of the activation functions needs to exceed a threshold of a current hidden node. In this example, a node maintains a deactivated state without firing (or sending) a signal to a next node until a predetermined threshold strength of activation is reached through input vectors.

In an example embodiment, the object recognition model 105 may be trained through supervised learning. The supervised learning refers to a method of inputting learning data and output data corresponding to the learning data into the ANN engine 100, and updating the weights so that the learning data and the output data correspond.

Figure 3:
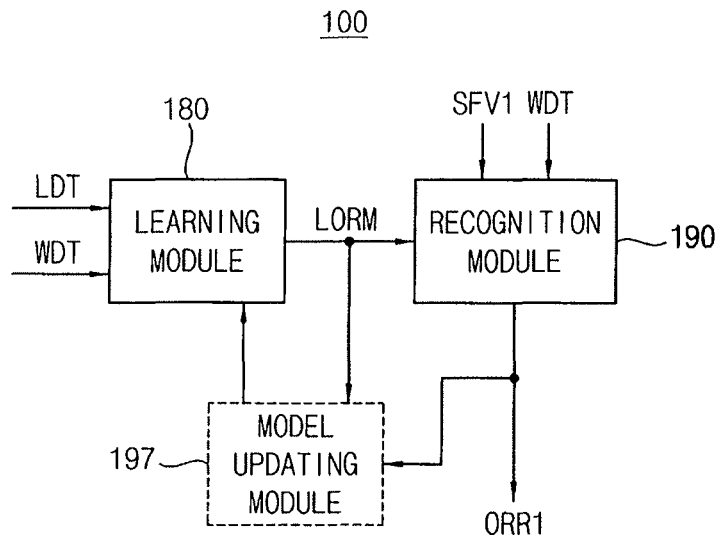
FIG. 3 illustrates an example of the artificial neural network engine in FIG. 1 according to example embodiments.

FIG. 3 illustrates an example of the ANN engine 100 in FIG. 1 according to example embodiments. Referring to FIG. 3, the ANN engine 100 may include a learning module 180 and a recognition module 190. The ANN engine 100 may further include a model updating module 197.

The learning module 180 may make the object recognition model ORM 105 learn using the learning data LDT and the weights WDT. The recognition module 190 may apply the first sub feature vector SFV1 and the weights WDT to the learned object recognition model LORM to provide the first object recognition result ORR1.

The model updating module 197 may determine whether to update the object recognition model ORM and may update the object recognition model ORM based on a result of the determination. The model updating module 197 may update the object recognition model ORM when a similarity between the first object recognition result ORR1 and an expected value of the object is greater than a reference value, i.e., a difference between the first object recognition result ORR1 and an expected value is sufficiently small.

Figure 4:
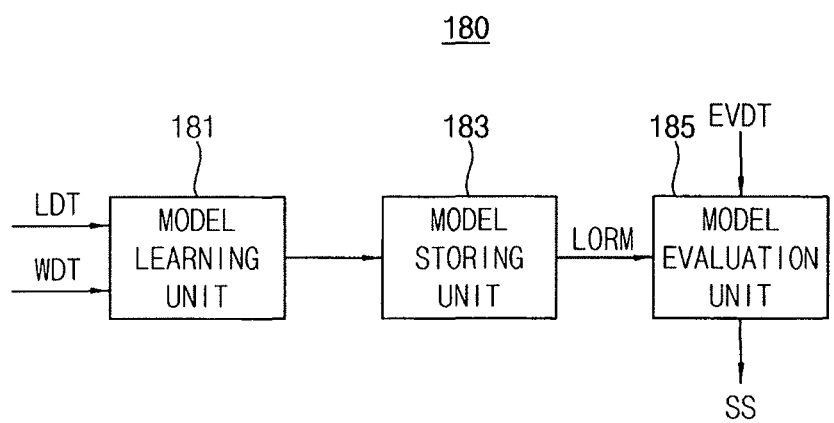
FIG. 4 illustrates an example of the learning module in FIG. 3 according to example embodiments.

FIG. 4 illustrates an example of the learning module 180 in FIG. 3 according to example embodiments. Referring to FIG. 4, the learning module 180 may include a model learning unit 181, a model storing unit 183, and a model evaluation unit 185.

The model learning unit 181 may make the object recognition model ORM learn using the learning data LDT and the weights WDT. The model storing unit 183 may store the learned object recognition model LORM. The model evaluation unit 185 may evaluate the learned object recognition model LORM based on an evaluation data EVDT. The model evaluation unit 185 may input the evaluation data EVDT to the learned object recognition model LORM and may make the model learning unit 181 learn the object recognition model ORM when a similarity signal SS output from the model evaluation unit 185 does not satisfy a first criteria.

When there are a plurality of pre-constructed object recognition models, the model learning unit 181 may determine an object recognition model in which relevance between the input learned data and the basic learning data is high as an object recognition model ORM to be learnt. In this case, the basic learning data can be pre-classified by types of data, and the object recognition model can be pre-constructed by types of data. According to various exemplary embodiments, the model learning unit 181 may learn the object recognition model ORM using a learning algorithm, e.g., error backpropagation, gradient descent, and the like.

Figure 5:
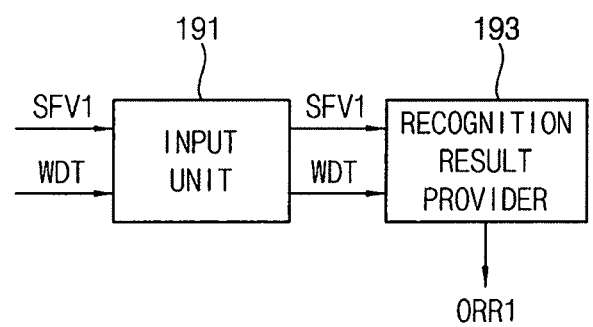
FIG. 5 illustrates an example of the recognition module in FIG. 3 according to example embodiments.

FIG. 5 illustrates an example of the recognition module 190 in FIG. 3 according to example embodiments. Referring to FIG. 5, the recognition module 190 may include an input unit 191 and a recognition result provider 193.

The input unit 191 may receive the weights WDT and the first sub feature vector SFV1 and provide them to the recognition result provider 193. The recognition result provider 193 may apply the first sub feature vector SFV1 and the weights WDT to the learned object recognition model LORM to provide the first object recognition result ORR1.

Figure 6:
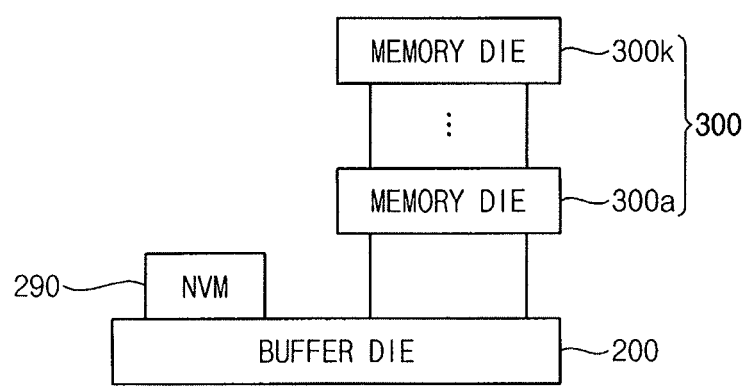
FIG. 6 illustrates an example of the stacked memory device in the electronic device of FIG. 1 according to example embodiments.

FIG. 6 illustrates an example of the stacked memory device in the electronic device of FIG. 1 according to example embodiments. Referring to FIG. 6, the stacked memory device 90 may include the buffer die 200 and a plurality of memory dies 300a-300k, where k is an integer greater than two. The buffer die 200 and the memory dies 300a-300k may be sequentially stacked on each other. The memory dies 300a-300k stacked on the buffer die 200 may be electrically connected to the buffer die 200 through conductors. The conductors may be one or more through silicon via TSVs.

In example embodiments, the stacked memory device 90 may further include a nonvolatile memory (NVM) device 290 on the buffer die 200, e.g., not stacked with the plurality of memory dies 300a-300k. The buffer die 200 may communicate with the CPU 30 and the GPU 50, and each of the memory dies 300a-300k may be a memory device including dynamic random access memory (DRAM) cells, e.g., a double data rate synchronous DRAM (DDR SDRAM), a low power DDR (LPDDR) SDRAM, a graphics DDR (GDDR) SDRAM, a Rambus DRAM (RDRAM), and the like.

Figure 7:
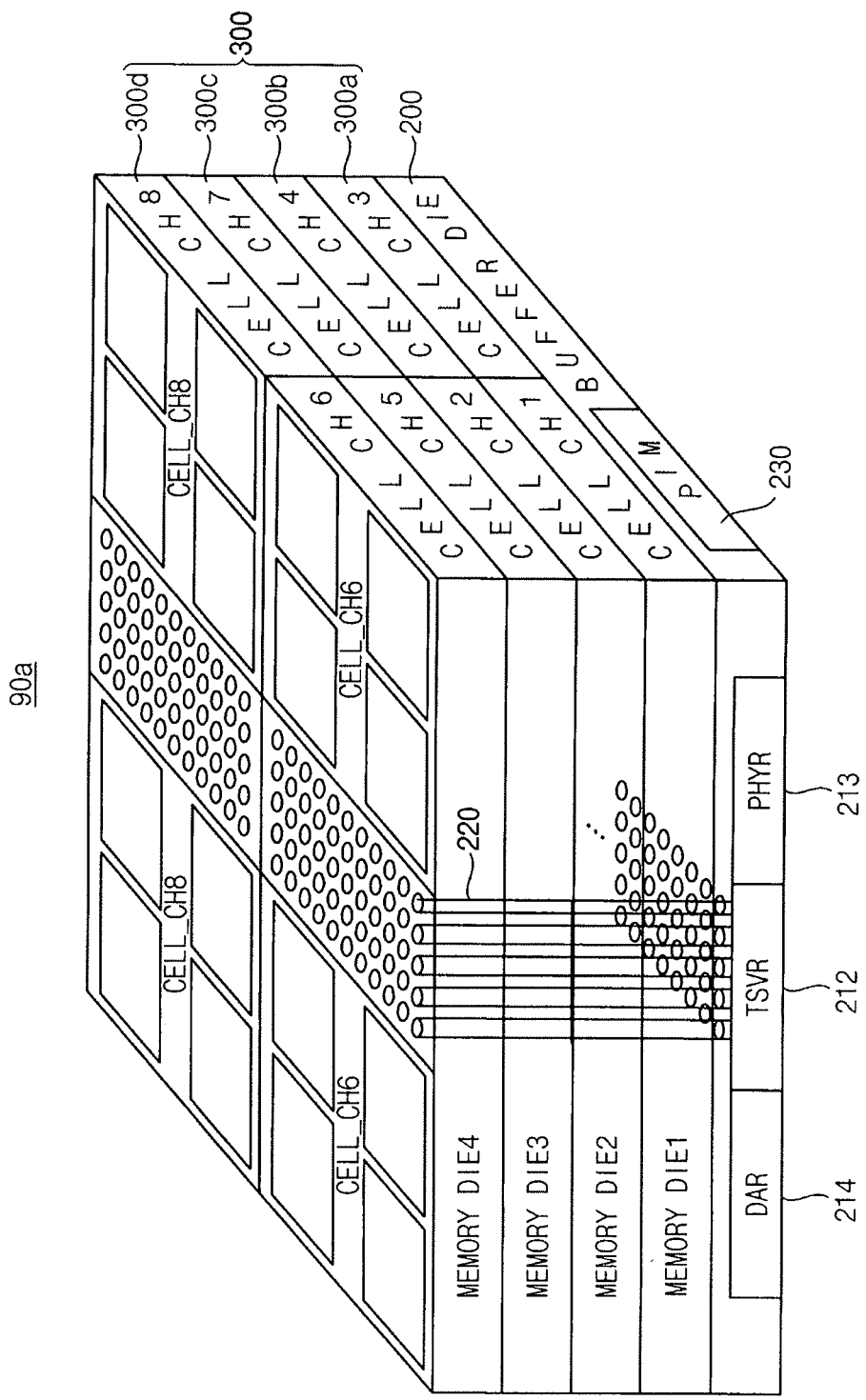
FIG. 7 illustrates an example of the stacked memory device in FIG. 6 according to example embodiments.

FIG. 7 illustrates an example of the stacked memory device 90 in FIG. 6 according to example embodiments. In FIG. 7, a memory device in a high bandwidth memory (HBM) form having an increased bandwidth by including a plurality of independent channels having independent interfaces is illustrated.

Referring to FIG. 7, a stacked memory device 90a may include a plurality of layers. For example, the stacked memory device 90a may include the buffer die 200 and one or more memory dies 300 stacked on buffer die 200. In the example of FIG. 7, although first to fourth memory dies 300a to 300d are illustrated as being provided, the number of the core dies may be variously changed.

Further, each of the memory dies 300 may include one or more channels. A single memory die includes two channels in the example of FIG. 7. Thus, an example in which the stacked memory device 70a has eight channels CH1 to CH8 is illustrated. For example, a first memory die 300a may include a first channel CH1 and a third channel CH3, a second memory die 300b may include a second channel CH2 and a fourth channel CH4, a third memory die 300c may include a fifth memory channel CH5 and a seventh channel CH7, and a fourth memory die 300d may include a sixth channel CH6 and an eighth channel CH8.

The buffer die 200 may communicate with a memory controller (an external device), receive a command, an address, and data from the memory controller, and provide the received command, address, and data to the memory dies 300. The buffer die 200 may communicate with the memory controller through a conductor, e.g., bumps and the like, on an outer surface thereof. The buffer die 200 may buffer the command, the address, and the data. Thus, the memory controller may interface with the memory dies 300 by driving only a load of the buffer die 200.

Further, the stacked memory device 90a may include a plurality of TSVs 220 passing through the layers. The TSVs 220 may be disposed corresponding to the plurality of channels CH1 to CH8, and the TSVs 220 may include components for inputting and outputting 1024-bit data when each of the independent channels has a 128-bit bandwidth.

The TSVs 220 may pass through the first to fourth memory dies 300a to 300d, and each of the first to fourth memory dies 300a to 300d may include a transmitter/a receiver connected to the TSVs 220. When a normal operation in which the inputting and outputting of the data is independently performed for each channel, only the transmitter/receiver of any one core die may be enabled, with respect to each of the TSVs 220. Thus, each of the TSVs 220 may independently deliver only the data of any one memory die, or any channel, as an independent channel for that one memory die or channel.

The buffer die 200 may include the PIM circuit 230, a TSV region 212, a physical region (PHYR) 213 and a direct access region (DAR) 214.

The TSV region 212 includes TSVs 220 for communicating with the memory dies 300. The physical region 213 includes a plurality of input-and-output (IO) circuits for communicating with an external memory controller, and various types of signals from the memory controller may be provided to the TSV region 212 through the physical region 213 and to the memory dies 300 through the TSVs 220.

The direct access region 214 may directly communicate with an external test device in a test mode for the stacked memory device 90a through a conductor on an outer surface of the stacked memory device 90a. Various types of signals provided from the tester may be provided to the memory dies 300 through the direct access region 214 and the TSV region 212. Alternatively, various types of signals provided from the test device may be provided to the memory dies 300 through the direct access region 214, the physical region 212, and the TSV region 212.

The PIM circuit 230 may include a multiplication and accumulation (MAC) circuit that may perform a matrix-vector multiplication. The PIM circuit 230 may perform the artificial intelligent operation in parallel with the GPU 50 to perform load balancing on neural network operation associated with the feature vector.

Figure 8:
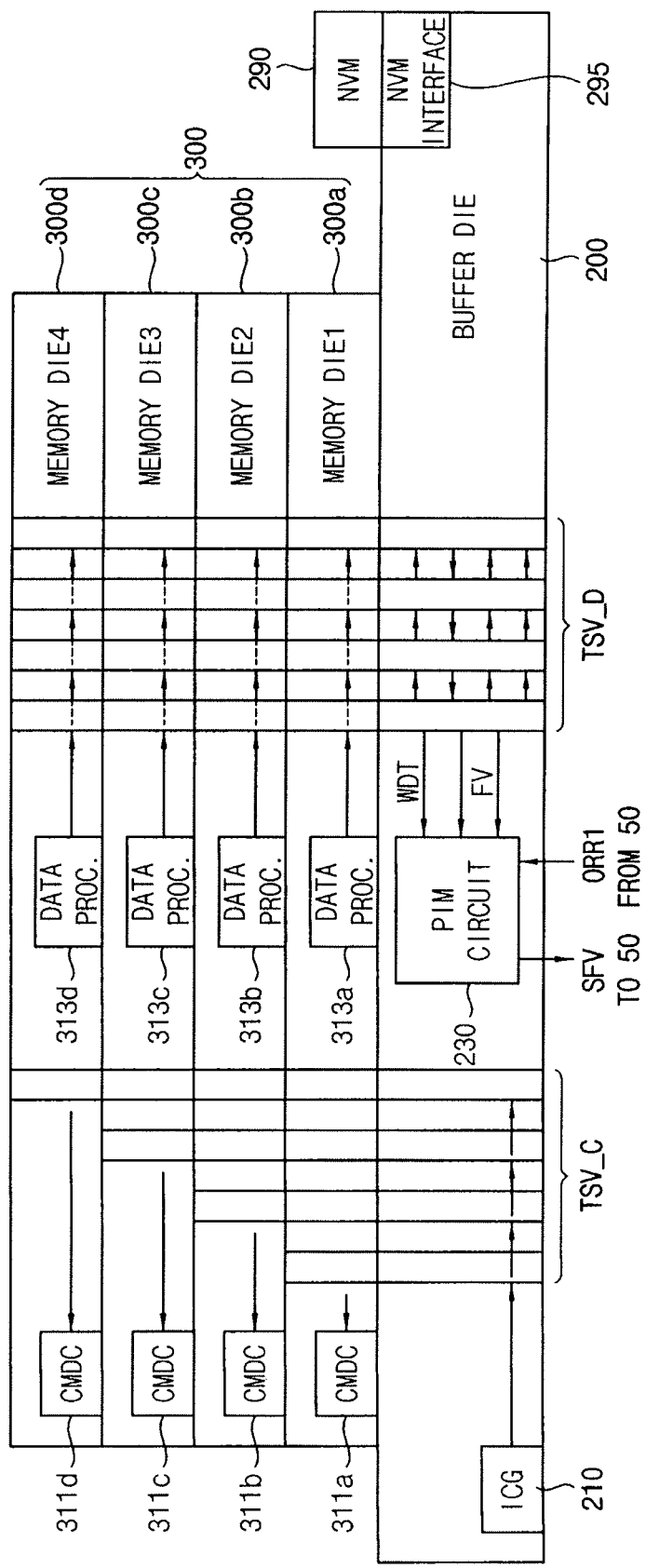
FIG. 8 illustrates that the artificial intelligent operation is distributed in the stacked memory device of FIG. 7.

FIG. 8 illustrates that the artificial intelligent operation is distributed in the stacked memory device of FIG. 7. Referring to FIGS. 7 and 8, the buffer die 200 includes an internal command generator 210 and the PIM circuit 230. Internal commands from the internal command generator 210 are provided to the memory dies 300 through command TSVs TSV_C independently for each channel.

The PIM circuit 230 receives the weights WDT and the feature vector FV which are stored in the memory dies 300. The feature vector FV may correspond to the input data or may be extracted from the input data. The PIM circuit 230 may divide the feature vector FV into the first sub feature vector SFV1 and the second sub feature vector SFV2, may provide the first sub feature vector SFV1 to the GPU 50, and may perform the first calculation to apply the weights WDT and the second sub feature vector to the learned object recognition model to obtain the second object recognition result.

The PIM circuit 230 may receive a first object recognition result ORR1 from the GPU 50, generated based on the first sub feature vector SFV1 and the weights WDT through the physical region 213, and may merge the first object recognition result and the second object recognition result to provide a merged object recognition result to a user.

The memory dies 300 may respectively include command decoders (CMDC) 311*a* to 311*d* which output internal control signals by decoding internal commands, and data processors 313*a* to 313*d* which perform processing operation on read data or data to be written. Referring to one of the memory dies 300 (for example, the first memory die 300*a*), the first memory die 300*a* may perform a memory operation according to a decoding result of command decoder 311*a*, and e.g., data of a plurality of bits stored in a memory cell region inside the first memory die 300*a* may be read and provided to the data processor 313*a*. The data processor 313*a* may process the data of the plurality of bits in parallel, and output the data processed in parallel to a plurality of data TSVs TSV_D in parallel.

According to a type of the memory operation, the data processor 313*a* may temporarily store the read data, and output the stored data to a data TSV TSV_D. Further, according to the control of the command decoder 311*a*, the data from the data processor 313*a* may be provided to at least one of the memory dies through the data TSV TSV_D. When an internal data processing operation is performed in which data of the first memory die 300*a* is copied into the second memory die 300*b*, the data from the data processor 313*a* may be provided to the second memory die 300*b* through the data TSV TSV_D.

The stacked memory device 90*a* may further include the nonvolatile memory device 290 on the buffer die 200. The buffer die 200 may include a nonvolatile interface 295 to control the nonvolatile memory device 290. The nonvolatile memory device 290 may store the learned object recognition model.

Figure 9:
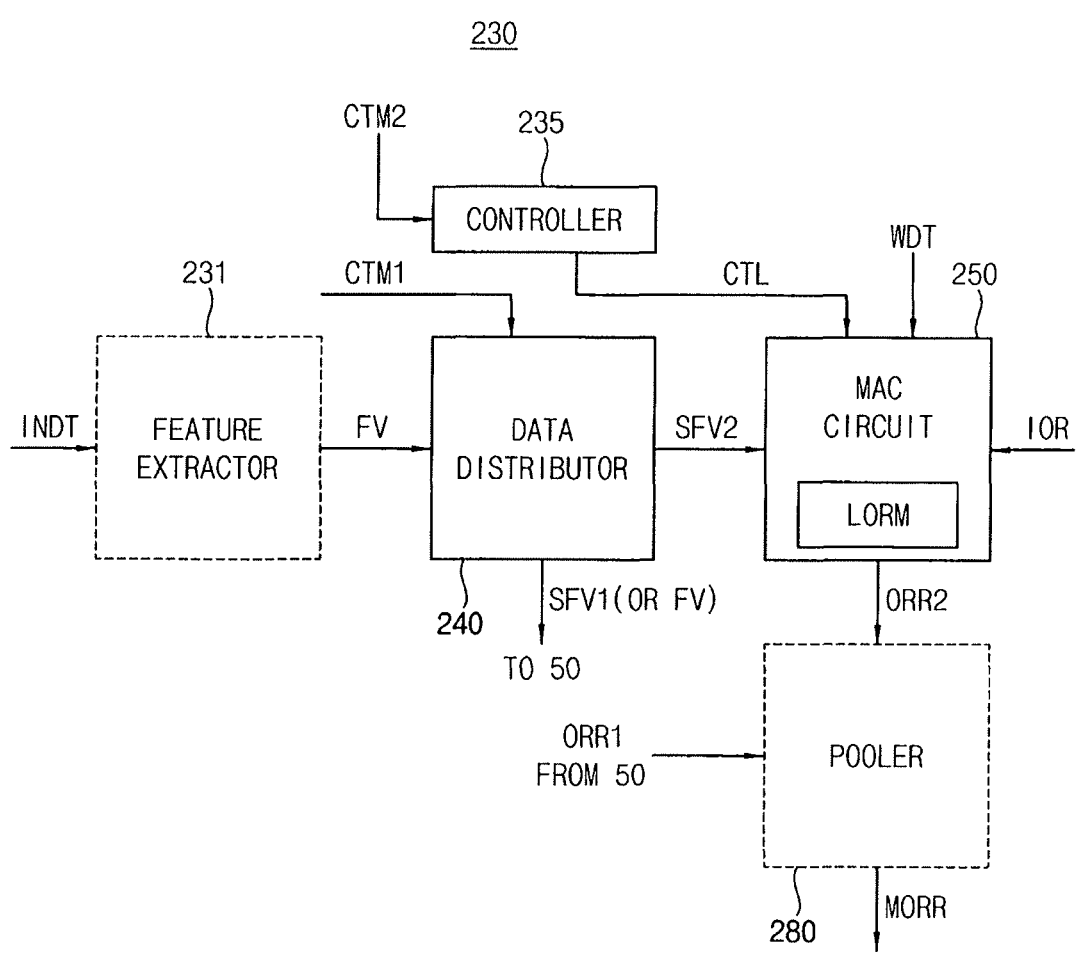
FIG. 9 illustrates an example of the processor-in-memory circuit in FIG. 1 according to example embodiments.

FIG. 9 illustrates an example of the processor-in-memory PIM circuit 230 in FIG. 1 according to example embodiments. Referring to FIG. 9, the PIM circuit 230 may include a controller 235, a data distributor 240, and a multiplication and accumulation (MAC) circuit 250. The PIM circuit 230 may further include a feature extractor 231 and a pooler 280.

The feature extractor 231 receives an input data INDT and extracts features of the input data INDT to provide the feature vector FV. The data distributor 240 receives the feature vector FV, divides the feature vector FV into the first sub feature vector SFV1 and the second sub feature vector SFV2 based on a first control message CTM1 from the system software 35, provides the first sub feature vector SFV1 to the GPU 50 and provides the second sub feature vector SFV2 to the MAC circuit 250. Alternatively, the data distributor 240 may provide the feature vector FV to the GPU 50 instead of dividing the feature vector FV.

The MAC circuit 250 performs matrix-vector multiplication corresponding to the learned object recognition model LORM on the second sub feature vector SFV2 and the weights WDT according to the control of the controller 235, and outputs a second object recognition result ORR2. The MAC circuit 250 applies the second sub feature vector SFV2 and the weights WDT to the learned object recognition model LORM to output the second object recognition result ORR2. The MAC circuit 250 performs the first calculation based on the second sub feature vector SFV2 and the weights WDT to provide the second object recognition result ORR2.

The controller 235 provides a control signal CTL to the MAC circuit 250 to perform the first calculation in response to a second control message CTM 2 from the system software 35.

The MAC circuit 250 may include a plurality of operations units. The MAC circuit 250 may perform the first calculation using an intermediate operation result IOR provided from the GPU 50. When the first sub feature vector SFV1 and the second sub feature vector SFV2 include at least some duplicate data, the GPU 50 may provide the MAC circuit 250 with the intermediate operation result IOR on the duplicate data.

The pooler 280 receives the first object recognition result ORR1 from the GPU 50, receives the second object recognition result ORR2 from the MAC circuit 250, and merges the first object recognition result ORR1 and the second object recognition result ORR2 to provide a merged object recognition result MORR to a user. In example embodiments, the feature extractor 231 and the pooler 280 may be outside of the PIM circuit 230.

Figure 10:
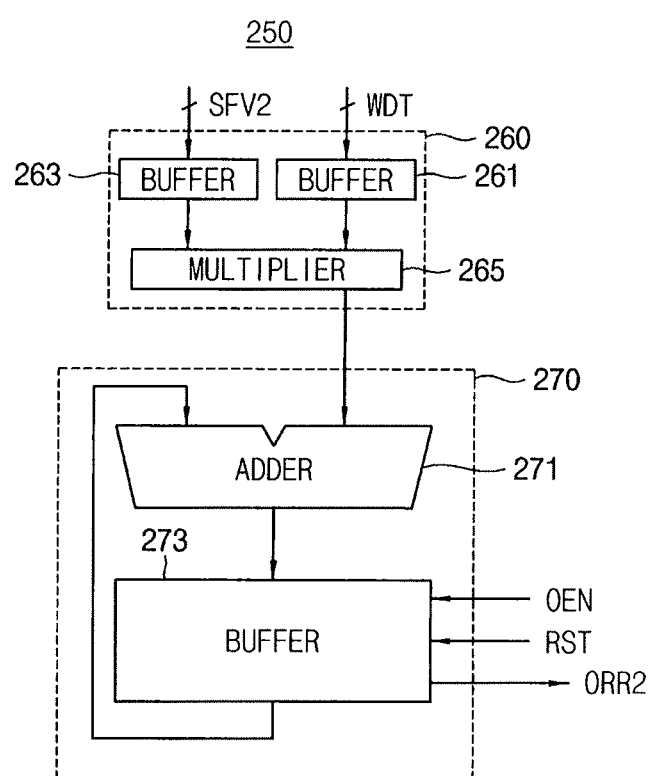
FIG. 10 illustrates an example of the MAC circuit in FIG. 9 according to example embodiments.

FIG. 10 illustrates an example of the MAC circuit 250 in FIG. 9 according to example embodiments. Referring to FIG. 10, the MAC circuit 250 may include a multiplication circuit 260 and an accumulation circuit 270.

The multiplication circuit 260 may receive the weights WDT and the second sub feature vector SFV2, and may multiply the second sub feature vector SFV2 by the weights WDT to provide a multiplied result as an output. The accumulation circuit 270 may accumulate the output of the multiplication circuit 260 to provide the second object recognition result ORR2.

The multiplication circuit 260 may include a first buffer 261, a second buffer 263 and a multiplier 265. The first buffer 261 may receive the weights WDT to output the weights WDT on a kernel basis corresponding to a first calculation window basis. The second buffer 263 may receive the second sub feature vector SFV2 to output the second sub feature vector SFV2 on a second calculation window basis. The multiplier 265 may multiply an output of the first buffer 261 by an output of the second buffer 263 to provide a multiplied result as an intermediate calculation result.

The accumulation circuit 270 may include an adder 271 and a buffer 273. The adder 271 may have a first input terminal and a second input terminal, and may receive the intermediate calculation result, i.e., the output of the multiplier 265. The adder 271 may add the intermediate calculation result from the multiplication circuit 260 with an output of the buffer 273, received at the second input terminal, to provide an added result to the buffer 273. The buffer 273 may feedback the output of the adder 271 to the second input terminal of the adder 271. The buffer 273 may provide the output of the adder 271 as the second object recognition result ORR2 in response to an output enable signal OEN and may be reset in response to a reset signal RST. The output enable signal OEN and the reset signal RST may be included in the control signal CCTL.

Figure 11:
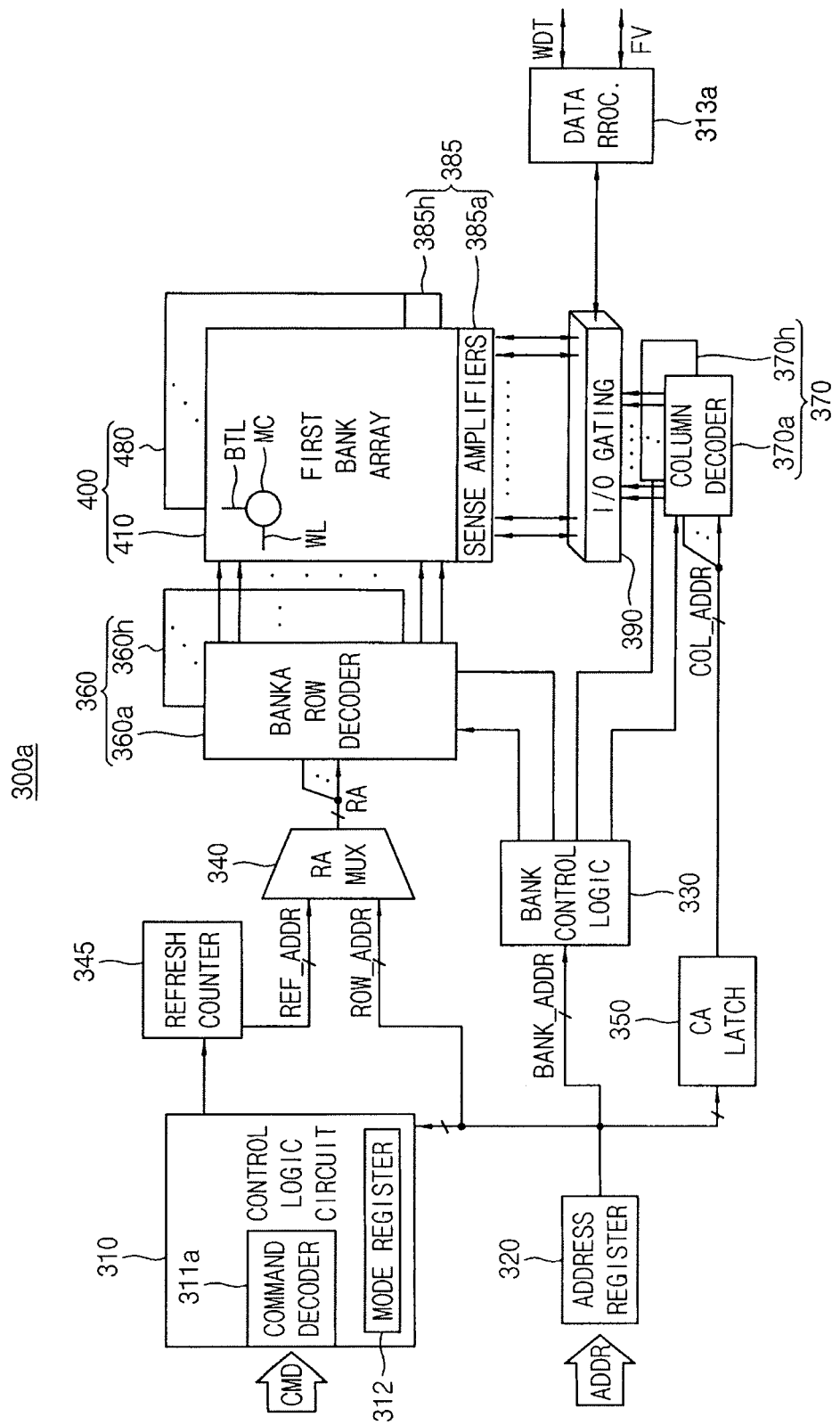
FIG. 11 illustrates one of the memory dies in the stacked memory device of FIG. 6 according to example embodiments.

FIG. 11 illustrates one of the memory dies 300*a* in the stacked memory device of FIG. 6 according to example embodiments. In FIG. 11, a configuration of the memory die 300a is illustrated and each configuration of the memory dies 300b-300k may be substantially the same as the configuration of the memory die 300a.

Referring to FIG. 11, the memory die 300a includes the control logic circuit 310, an address register 320, a bank control logic 330, a refresh counter 345, a row address multiplexer 340, a column address latch 350, a row decoder 360, a column decoder 370, the memory cell array 400, a sense amplifier unit 385, an I/O gating circuit 390, and a data processor 313a.

The memory cell array 400 includes first through eighth bank arrays 410-480. The row decoder 360 includes first through eighth bank row decoders 360a-360h respectively coupled to the first through eighth bank arrays 410-480, the column decoder 370 includes first through eighth bank column decoders 370a-370h respectively coupled to the first through eighth bank arrays 410-480, and the sense amplifier unit 385 includes first through eighth bank sense amplifiers 385a-385h respectively coupled to the first through eighth bank arrays 410-480.

The first through eighth bank arrays 410-480, the first through eighth bank row decoders 360a-360h, the first through eighth bank column decoders 370a-370h and first through eighth bank sense amplifiers 385a-385h may form first through eighth banks. Each of the first through eighth bank arrays 410-480 includes a plurality of memory cells MC formed at intersections of a plurality of word-lines WL and a plurality of bit-line BTL.

The address register 320 receives the address ADDR including a bank address BANK_ADDR, a row address ROW_ADDR, and a column address COL_ADDR from an outside. The address register 320 provides the received bank address BANK_ADDR to the bank control logic 330, provides the received row address ROW_ADDR to the row address multiplexer 340, and provides the received column address COL_ADDR to the column address latch 350.

The bank control logic 330 generates bank control signals in response to the bank address BANK_ADDR. One of the first through eighth bank row decoders 360a-360h corresponding to the bank address BANK_ADDR is activated in response to the bank control signals, and one of the first through eighth bank column decoders 370a-370h corresponding to the bank address BANK_ADDR is activated in response to the bank control signals.

The row address multiplexer 340 receives the row address ROW_ADDR from the address register 320, and receives a refresh row address REF_ADDR from the refresh counter 345. The row address multiplexer 340 selectively outputs the row address ROW_ADDR or the refresh row address REF_ADDR as a row address RA. The row address RA that is output from the row address multiplexer 340 is applied to the first through eighth bank row decoders 360a-360h. The refresh counter 345 may sequentially output the refresh row address REF_ADDR under control of the control logic circuit 310.

The activated one of the first through eighth bank row decoders 360a-360h, by the bank control logic 330, decodes the row address RA that is output from the row address multiplexer 340, and activates a word-line corresponding to the row address RA. For example, the activated bank row decoder applies a word-line driving voltage to the word-line corresponding to the row address.

The column address (CA) latch 350 receives the column address COL_ADDR from the address register 320, and temporarily stores the received column address COL_ADDR. In some embodiments, in a burst mode, the column address latch 350 generates column addresses that increment from the received column address COL_ADDR. The column address latch 350 applies the temporarily stored or generated column address to the first through eighth bank column decoders 370a-370h.

The activated one of the first through eighth bank column decoders 370a-370h activates a sense amplifier corresponding to the bank address BANK_ADDR and the column address COL_ADDR through the I/O gating circuit 390. The I/O gating circuit 390 includes a circuitry for gating input/output data. The I/O gating circuit 390 may further include input data mask logic, read data latches for storing data that is output from the first through eighth bank arrays 410-480, and write drivers for writing data to the first through eighth bank arrays 410-480.

Data (including the weights and the feature vector) read from one bank array of the first through eighth bank arrays 410-480 is sensed by a corresponding sense amplifier 385a-385h coupled to the one bank array from which the data is to be read, and is stored in the read data latches of the I/O gating circuit 390. The data stored in the read data latches of the I/O gating circuit 390 may be provided to the outside or another memory die through the data processor 313a.

The data to be written in one bank array of the first through eighth bank arrays 410-480 may be provided to the I/O gating circuit 390 and the I/O gating circuit 390 may write the data in one bank array through the write drivers. The data processor 313a may store the weights WDT and the feature vector FV in the memory cell array 400 through the I/O gating circuit 390 in a write operation and may provide the weights WDT and the feature vector FV to the PIM circuit 230 in the buffer die 200 through the data TSVs TSV_D.

The control logic circuit 310 may control operations of the memory die 300a. For example, the control logic circuit 310 may generate control signals for the memory die 300a in order to perform a write operation or a read operation. The control logic circuit 310 includes a command decoder 311a that decodes the command CMD received from the internal command generator 210 and a mode register 312 that sets an operation mode of the memory die 300a.

Figure 12:
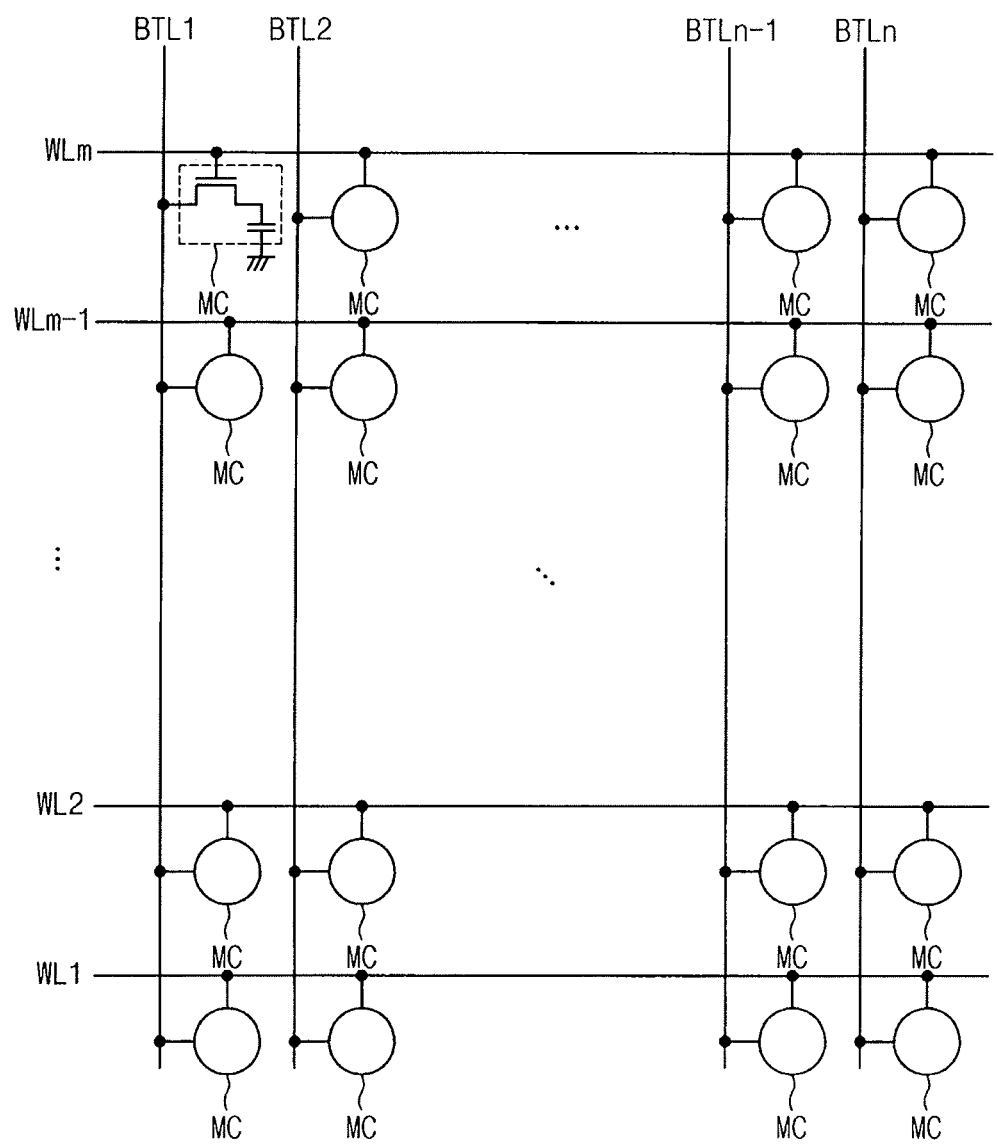
FIG. 12 illustrates an example of the first bank array in the memory die of FIG. 11.

FIG. 12 illustrates an example of the first bank array in the memory die of FIG. 11. Referring to FIG. 12, the first bank array 410 includes a plurality of word-lines WL1~WLm (m is a natural number greater than two), a plurality of bit-lines BTL1~BTLn (n is a natural number greater than two), and a plurality of memory cells MCs at intersections between the word-lines WL1~WLm and the bit-lines BTL1~BTLn. Each of the memory cells MCs includes a cell transistor coupled to each of the word-lines WL1~WLm and each of the bit-lines BTL1~BTLn, and a cell capacitor coupled to the cell transistor.

In FIGS. 11 and 12, it is illustrated as the memory die 300a is implemented with DRAM including dynamic memory cells. Alternatively, each of the memory dies 300a-300k may be implemented with a resistive memory device including resistive memory cells or other memory device.

FIG. 13 illustrates a kernel associated with the feature vector and the weights of the PIM circuit 230 of FIG. 9. Referring to FIG. 13, when the feature vector FV is represented by K*K matrix (K is illustrated as seven in FIG. 13) and a kernel KRN1 associated with the weights WDT is represented by I*I matrix (I is illustrated as three in FIG. 13), the data distributor 240 divides the feature vector FV into the first sub feature vector SFV1 and the second sub feature vector SFV2, provides the first sub feature vector SFV1 to the GPU 50 and provides the second sub feature vector SFV2 to the MAC circuit 250.

The GPU 50 may perform the vector-matrix multiplication by applying the kernel KRN1 to K*(a natural number equal to or greater than (I+(K−1)) matrix corresponding to the first sub feature vector SFV1. Therefore, amount of calculation may be reduced as compared to when the feature vector FV is provided in its entirety to the GPU 50 and the GPU 50 perform the vector-matrix multiplication on the entire feature vector FV. In addition, while the GPU 50 performs the vector-matrix multiplication on the first sub feature vector SFV1, the MAC circuit 250 performs the vector-matrix multiplication on the second sub feature vector SFV2 by applying the kernel KRN1 to the second sub feature vector SFV2. A total matrix size of the first sub feature vector SFV1 and the second sub feature vector combined may be greater than the K*K matrix such that a portion of the first sub feature vector SFV1 and the second sub feature vector overlap to have same data in common, e.g., duplicate data. For example, as illustrated in FIG. 13, the first sub feature vector SFV1 may be a 5*7 matrix and the second sub feature vector may a 4*7 matrix, and the first sub feature vector SFV1 and the second sub feature vector may overlap in the fourth and fifth columns of the 7*7 feature vector FV.

Figure 14:
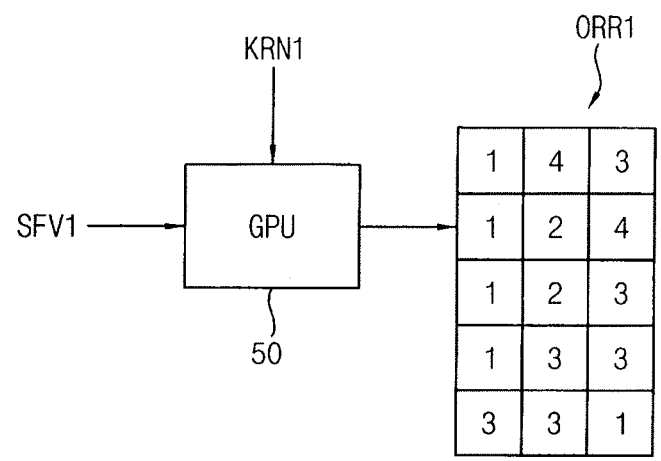
FIG. 14 illustrates the second calculation in the GPU in FIG. 1.
Figure 15:
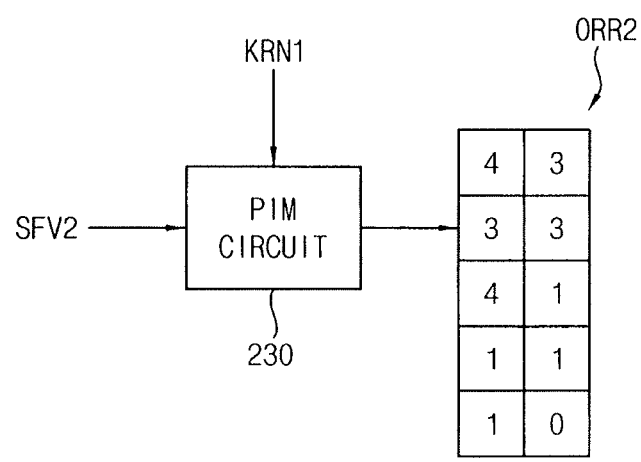
FIG. 15 illustrates the first calculation in the MAC circuit of FIG. 15

FIG. 14 illustrates the second calculation in the GPU in FIG. 1. FIG. 15 illustrates the first calculation in the MAC circuit of FIG. 15 and FIG. 16 illustrates an operation of the pooler in FIG. 9.

Referring to FIG. 14, the GPU 50 applies the kernel KRN1 to the first sub feature vector SFV1 and performs the vector-matrix multiplication on the kernel KRN1 and the first sub feature vector SFV1 to provide the first object recognition result ORR1. The first object recognition result ORR1 may be represented by 5*3 matrix.

Referring to FIG. 15, the PIM circuit 230 applies the kernel KRN1 to the second sub feature vector SFV2 and performs the vector-matrix multiplication on the kernel KRN1 and the second sub feature vector SFV2 to provide the second object recognition result ORR2. The second object recognition result ORR2 may be represented by 5*2 matrix.

Figure 16:
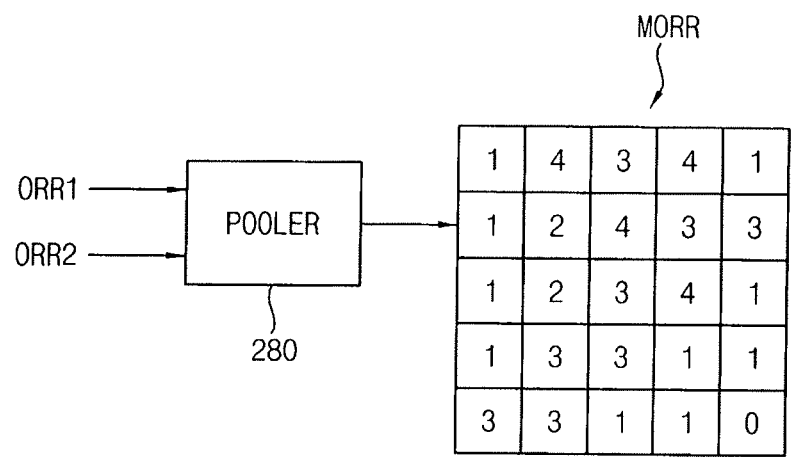
FIG. 16 illustrates an operation of the pooler in FIG. 9.

Referring to FIG. 16, the pooler 280 merges the first object recognition result ORR1 and the second object recognition result ORR2 to output the merged object recognition result MORR. The merged object recognition result MORR may be represented by 5*5 matrix.

Figure 17:
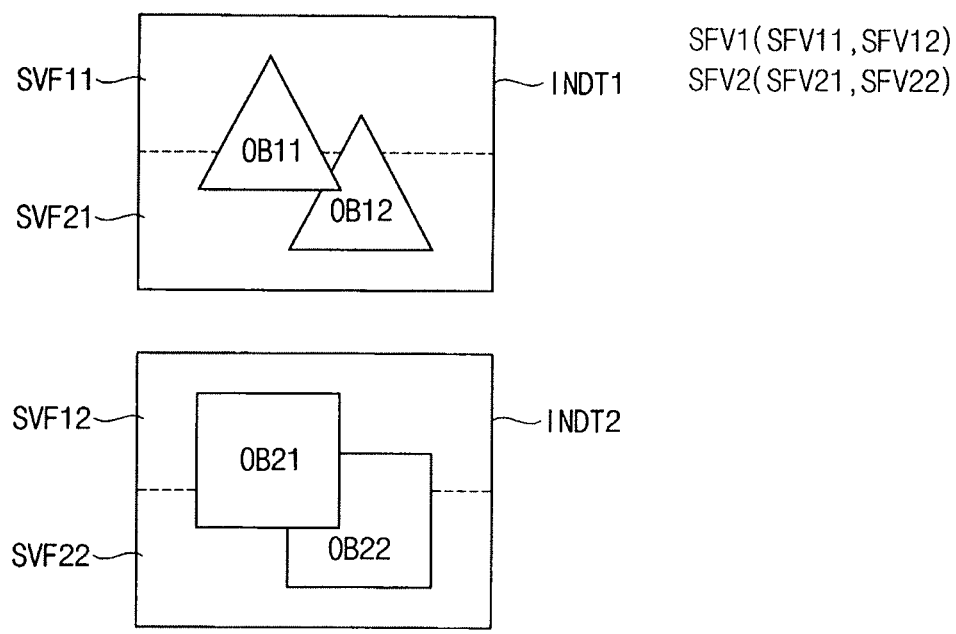
FIGS. 17 and 18 illustrate that the data distributor in FIG. 9 divides the input data or the feature vector into the first sub feature vector and the second sub feature vector, respectively.
Figure 18:
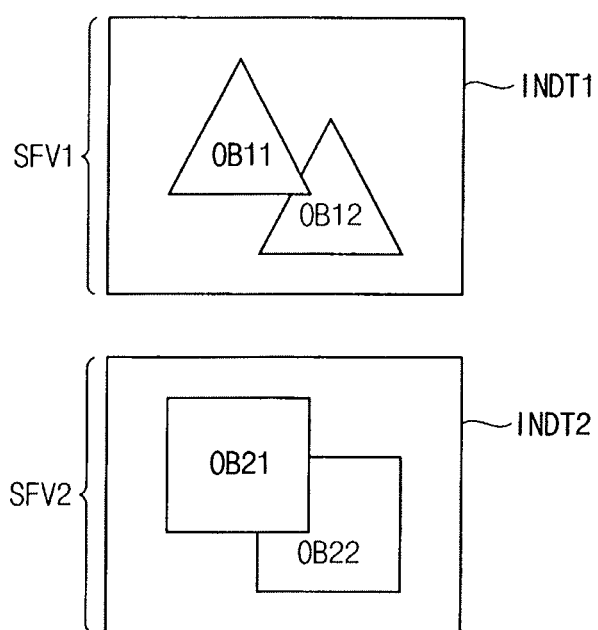

FIGS. 17 and 18 illustrate that the data distributor 240 in FIG. 9 divides the input data or the feature vector FV into the first sub feature vector SFV1 and the second sub feature vector SFV2, respectively.

FIG. 17 illustrates that the data distributor 240 in FIG. 9 divides the input data or the feature vector into the first sub feature vector SFV1 and the second sub feature vector SFV2 by simply dividing the input data or the feature vector in half according to a control of the controller 235.

Referring to FIG. 17, when a first input data INDT1 includes objects OB11 and OB12, and a second input data INDT2 includes objects OB21 and OB22, the data distributor 240 divides the first input data INDT1 into a first portion SFV11 and a second portion SFV21, divides the second input data INDT2 into a first portion SFV12 and a second portion SFV22, creates the first sub feature vector SFV1 from the first portions SFV11, SFV12, and creates the second sub feature vector SFV2 from the second portions SFV21, SFV22.

Referring to FIG. 18, when a first input data INDT1 includes objects OB11 and OB12, and a second input data INDT2 includes objects OB21 and OB22, the data distributor 240 creates the first sub feature vector SFV1 from the first input data INDT1 and creates the second sub feature vector SFV2 from the second input data INDT2.

Figure 19:
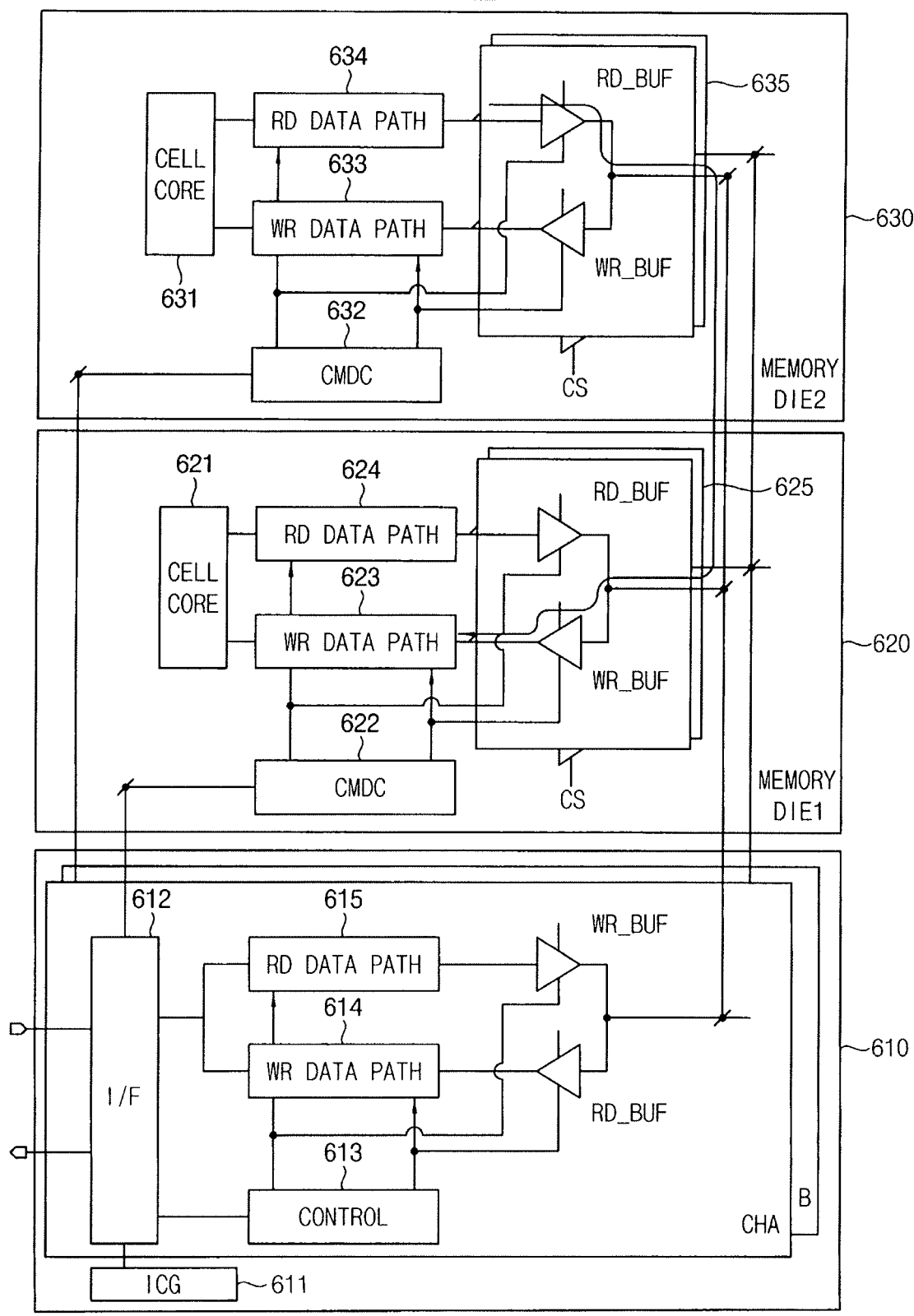
FIG. 19 illustrates an example in which a data copy operation is performed in the stacked memory device according to example embodiments.

FIG. 19 illustrates an example in which a data copy operation is performed in the stacked memory device according to example embodiments. Referring to FIG. 19, a stacked memory device 600 may include a buffer die 610 and first and second memory dies 620 and 630.

Hereinafter, operations of a single buffer die and two memory dies are illustrated for convenience of description. Further, the PIM circuit illustrated in the following embodiments may perform a command decoding function in the above-described embodiment. Further, the PIM circuit may further perform a function in which a chip selection signal CS for selection of a channel or chip is provided according to the internal data processing operation. According to a modifiable embodiment, the chip selection signal CS illustrated in the following drawings may be implemented to be generated through the command decoder of each of the memory dies.

The buffer die 610 may communicate with an external device, and may include an internal command generator (ICG) 611 that generates internal commands for performing a series of internal data processing operations in response to a specific command from the external device. The internal command generator 611 may provide the internal commands to the first and second memory dies 620 and 630 while changing the chip selection signal CS for selecting the memory die. Further, data may be transmitted and received between the buffer die 610 and the first and second memory dies 620 and 630, and data TSVs for transmitting and receiving the data may be commonly disposed in the buffer die 610 and the first and second memory dies 620 and 630.

The buffer die 610 may include a plurality of input/output (I/O) circuits in order to independently perform interfacing with respective channels CHA and CHB for the first and second memory dies 620 and 630. For example, the buffer die 610 may include an I/O circuit for the A channel CHA which interfaces with the first memory die 620 and an I/O circuit for the B channel CHB which interfaces with the second memory die 630. Various components provided in each of the I/O circuits may be disposed in at least one area of the buffer die 610, and for example, the components of each of the I/O circuits may be disposed in a physical area.

The I/O circuit corresponding to each of the channels may include an interface (I/F) 612 which interfaces with the external device, a path controller 613, a read data path 614, and a write data path 615. The first and second memory dies 620 and 630 may include transceivers 625 and 635, respectively, which input and output data through data TSVs, and the transceiver of each of the first and second memory dies 620 and 630 may be controlled to be enabled by the chip selection signal CS.

The first memory die 620 may include a cell core 621 including a memory cell array, a command decoder (CMDC) 622 which decodes an internal command, a write (WR) data path 623, a read (RD) data path 624, and transceiver 625. The second memory die 630 may be implemented in the same or similar manner as the first memory die 620, and thus the second memory die 630 may include a cell core or group 631, a command decoder 632, a write data path 633, a read data path 634, and transceiver 635.

According to the command from the external device, an internal data processing operation for copying data of the second memory die 630 into the first memory die 620 may be performed. The internal data processing may be performed by generating an internal command inside the stacked memory device 600 without the intervention of the external device. For example, the buffer die 610 may provide the internal command to the second memory die 630, and the second memory die 630 may read data in response to the received internal command and provide the read data to the transceiver 635 through the read data path 634. The read data is provided to the transceiver 625 through the data TSV and is copied to the cell core 621 through the write buffer WR_BUF in the transceiver 625 and the write data path 623.

Figure 20:
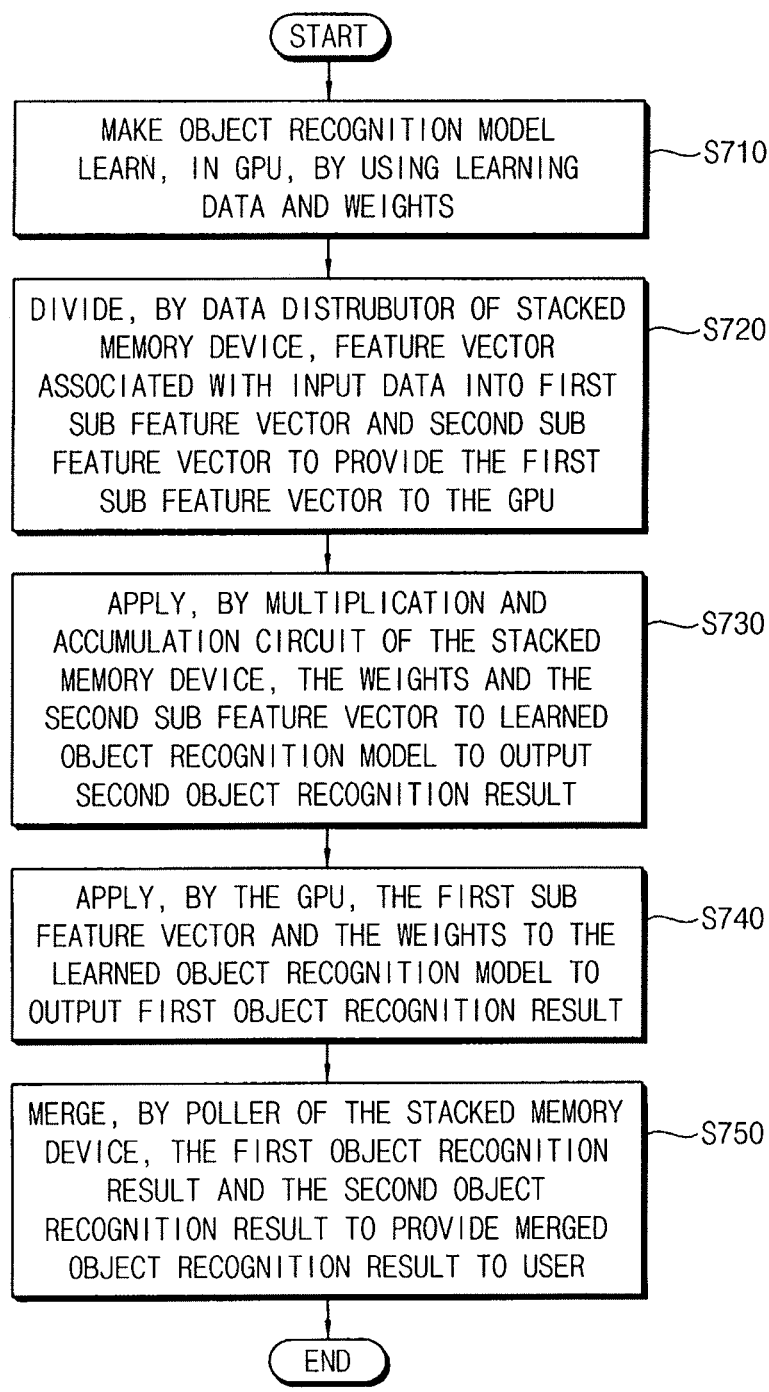
FIG. 20 illustrates a flow chart of a method of operating an electronic device according to example embodiments.

FIG. 20 is a flow chart illustrating a method of operating an electronic device according to example embodiments. Referring to FIGS. 1 through 18 and 20, in a method of operating the electronic device 10 that includes the graphic processor 50 including the ANN engine 100, and the stacked memory device 90 communicating with the graphic processor 50. The ANN engine 100 makes an object recognition model 105 learn by applying learning data LDT and weights WDT to the object recognition model 105 to provide a learned object recognition model LORM (S710). A data distributor 240 in the stacked memory device 90 divides a feature vector FV associated with an input data into a first sub feature vector SFV1 and a second feature vector SFV2, and provides the first sub feature vector SFV1 to the graphic processor 50 (S720).

A MAC circuit 250 in the stacked memory device 90 performs a first calculation to apply the second sub feature vector SFV2 and the weights WDT in the learned object recognition model LORM to provide a second object recognition result ORR2 (S730). The ANN engine 100 performs a second calculation to apply the first sub feature vector SFV2 and the weights WDT to the learned object recognition model LORM to provide a first object recognition result ORR1 (S740).

The pooler 280 in the stacked memory device 90 merges the first object recognition result ORR1 and the second object recognition result ORR2 to provide a merged object recognition result MORR to a user (S750). The first calculation and the second calculation may be performed in parallel.

Accordingly, the PIM circuit 230 in the stacked memory device 90 divides the feature vector, corresponding to an input data or extracted from the input data, into the first sub feature vector and the second sub feature vector, provides the first sub feature vector to the graphic processor 50, and performs an AI calculation on the second sub feature vector in parallel with the graphic processor 50 performing an AI calculation on the first sub feature vector. Therefore, the electronic device may perform load balancing on the feature. Accordingly, the electronic devices according to example embodiments may enhance performance of AI calculation without modifying the GPU and/or CPU.

Figure 21:
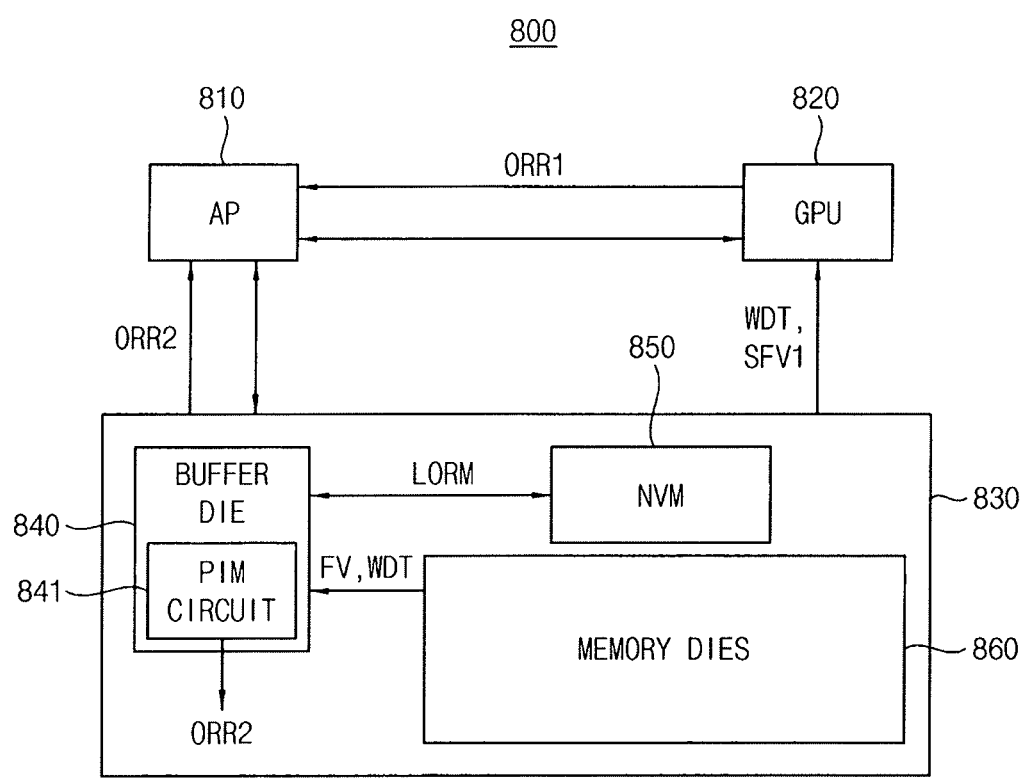
FIG. 21 illustrates an artificial intelligence (AI) accelerator (i.e., an electronic device) including a hybrid stacked memory device according to example embodiments.

FIG. 21 illustrates an artificial intelligence (AI) accelerator (i.e., an electronic device) including a hybrid stacked memory device according to example embodiments. Referring to FIG. 21, an AI accelerator 800 may include an application processor 810, a GPU 820, and a hybrid stacked memory device 830.

The hybrid stacked memory device 830 may include a buffer die 840, a nonvolatile memory device 850 and a plurality of memory dies 860. The application processor 810 may control the GPU 820 and the hybrid stacked memory device 830. The buffer die 840 may include a PIM circuit 841. The PIM circuit 841 may employ the PIM circuit 230 of FIG. 9.

The hybrid stacked memory device 830 stores weights WDT to provide the weights WDT to the GPU 820, and divides a feature vector associated with input data to provide a first sub feature vector SFV1 to the GPU 820. The GPU 820 applies the weights WDT and the sub feature vector SFV1 to a learned object recognition model to provide a first object recognition result ORR1 to the application processor 810.

The nonvolatile memory device 850 stores a learned object recognition model LORM provided from the GPU 820, and provides the earned object recognition model LORM to the PIM circuit 841. The PIM circuit 841 divides the feature vector FV from the memory dies 860 into the first sub feature vector SFV and the second sub feature vector, and applies the second sub feature vector and the weights WDT to the learned object recognition model LORM to provide a second object recognition result ORR2 to the application processor 810. The application processor 810 merges the first object recognition result ORR1 and the second object recognition result ORR2 to provide a merged object recognition result to a user.

Figure 22:
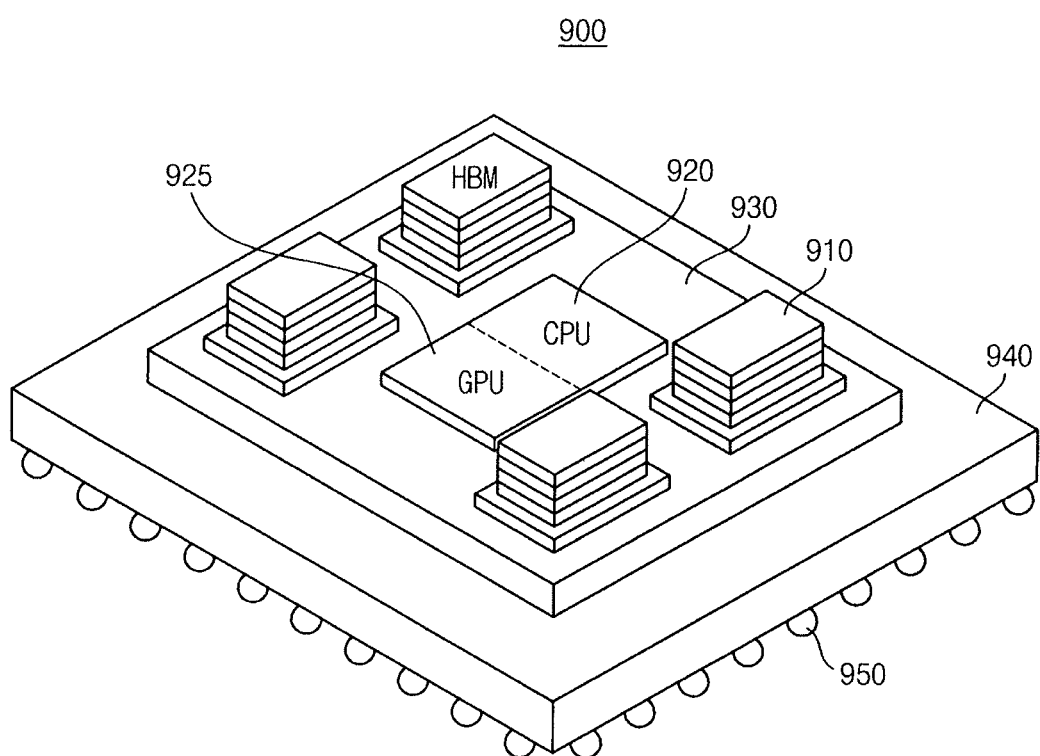
FIG. 22 illustrates a semiconductor package including the stacked memory device according to example embodiments.

FIG. 22 illustrates a semiconductor package including the stacked memory device according to example embodiments. Referring to FIG. 22, a semiconductor package 900 may include one or more stacked memory devices 910, a CPU 920, and a GPU 925.

The stacked memory devices 910, the CPU 920 and the GPU 925 may be mounted on an interposer 930, and the interposer on which the stacked memory device 910, the CPU 920, and the GPU 925 are mounted may itself be mounted on a package substrate 940. The CPU 920 and the GPU 925 may correspond to the CPU 30 and the GPU 50 in FIG. 1 respectively.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies. The buffer die may include a PIM circuit capable of performing AI calculation (operation) in parallel with the GPU 925.

The plurality of stacked memory devices 910 may be mounted on the interposer 930, and the CPU 920 and the GPU 925 may communicate with the plurality of stacked memory devices 910.

For example, each of the stacked memory devices 910, the CPU 920 and the GPU 925 may include a physical region, and communication may be performed between the stacked memory devices 910, the CPU 920 and the GPU 925 through the physical regions. Meanwhile, when the stacked memory device 910 includes a direct access region, a test signal may be provided into the stacked memory device 910 through conductive means (e.g., solder balls 950) mounted under package substrate 940 and the direct access region.

Here, the interposer 930 may include an embedded multi-die interconnect bridge (EMIB) which is an organic or non-TSV manner having a TSV form or a printed circuit board (PCB) form.

Embodiments are described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

In some example embodiments, a processor-in-memory circuit in the memory device divides the feature vector, corresponding to an input data or extracted from the input data, into the first sub feature vector and the second sub feature vector, provides the first sub feature vector to the graphic processor, and performs an AI calculation on the second sub feature vector in parallel with a graphic processor performing an AI calculation on the first sub feature vector. Therefore, the electronic device may perform load balancing on the feature. Accordingly, the electronic devices according to example embodiments may enhance performance of AI calculation without modifying the GPU and/or CPU.

Some example embodiments provide an electronic device capable of performing artificial intelligent operation in parallel. Some example embodiments provide a method of operating an electronic device, capable of processing artificial intelligent operation in parallel. Some example embodiments may enhance performance of AI calculation without modifying the GPU and/or CPU. Aspects of embodiments may be applied to various devices that employ AI.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electronic device, comprising:
a graphic processor including an artificial neural network engine to make an object recognition model learn by using learning data and weights to provide a learned object recognition model; and
a memory device to store the learning data and the weights, to divide a feature vector extracted from an input data into a first sub feature vector and a second sub feature vector, to provide the first sub feature vector to the graphic processor, to receive the learned object recognition model from the graphic processor, and to perform a first calculation to apply the second sub feature vector and the weights to the learned object recognition model to provide a second object recognition result,
wherein the artificial neural network engine is to perform a second calculation to apply the first sub feature vector and the weights to the learned object recognition model to provide a first object recognition result, and to provide the first object recognition result to the memory device, the second calculation being performed in parallel with the first calculation.

2. The electronic device as claimed in claim 1, wherein the memory device is to store the first object recognition result, and to merge the first object recognition result and the second object recognition result to provide a merged object recognition result to a user.

3. The electronic device as claimed in claim 1, wherein the memory device includes:
a buffer die to communicate with the graphic processor and an external device;
a plurality of memory dies stacked on the buffer die; and
a plurality of through silicon vias (TSVs) extending through the plurality of memory dies to connect to the buffer die,
wherein each of the plurality of memory dies includes a memory cell array which includes a plurality of dynamic memory cells coupled to a plurality of word-lines and a plurality of bit-lines and the dynamic memory cells store the learning data, the weights and the feature vector, and
wherein the buffer die includes a processor-in-memory circuit connected to the memory dies through the plurality of TSVs, and the processor-in-memory circuit divides the feature vector into the first sub feature vector and the second sub feature vector, and performs the first calculation.

4. The electronic device as claimed in claim 3, wherein the processor-in-memory circuit includes:
a data distributor to receive the feature vector from at least some of the memory dies, to divide the feature vector into the first sub feature vector and the second sub feature vector, and to provide the first sub feature vector to the graphic processor;
a multiplication and accumulation (MAC) circuit to receive the second sub feature vector from the data distributor, to apply the weights to the second sub feature vector from the data distributor, and to perform the second calculation to output the second object recognition result; and
a controller to control the MAC circuit.

5. The electronic device as claimed in claim 4, wherein the MAC circuit is to perform matrix-vector multiplication operation on the second sub feature vector and the weights.

6. The electronic device as claimed in claim 4, further comprising:
a central processing unit (CPU) to communicate with the graphic processor and the memory device through a bus,
wherein the CPU includes a system software to control the data distributor and the controller, and
the system software is to determine a division ratio of the first sub feature vector and the second sub feature vector.

7. The electronic device as claimed in claim 6, wherein the data distributor is to provide the first sub feature vector and the second sub feature vector by dividing the feature vector based on at least one object included in the feature vector under control of the system software.

8. The electronic device as claimed in claim 6, wherein the data distributor is to provide the first sub feature vector and the second sub feature vector by dividing the feature vector by a half under control of the system software.

9. The electronic device as claimed in claim 3, wherein the buffer die further includes a pooler to receive the first object recognition result and the second object recognition result when the first calculation and the second calculation are completed, and to provide a merged object recognition result by merging the first object recognition result and the second object recognition result.

10. The electronic device as claimed in claim 3, wherein the memory device further includes a nonvolatile memory device formed on the buffer die and the nonvolatile memory device stores the learned object recognition model.

11. The electronic device as claimed in claim 1, wherein:
the first sub feature vector and the second sub feature vector include at least some duplicate data,
the graphic processor is to provide the memory device with an intermediate operation result on the at least some duplicate data, and
the memory device is to perform the first calculation using the intermediate operation result on the at least some duplicate data.

12. The electronic device as claimed in claim 1, wherein the artificial neural network engine is to provide the learned object recognition model to the memory device when a similarity between a result of applying the learning data and the weights to the object recognition model and an expected value of the learning data is equal to or greater than a reference value.

13. The electronic device as claimed in claim 1, wherein the object recognition model includes a neural network model or a deep learning model which performs computing based on connection relationship among a plurality of network nodes and weights of the network nodes.

14. The electronic device as claimed in claim 13, wherein the object recognition model includes:
an input layer to receive the learning data or the first sub feature vector, the input layer including a plurality of input nodes;
an output layer to generate an output of the learning data or the first sub feature vector, the output layer including a plurality of output nodes;
a hidden layer to connect the input layer to the output layer, the hidden layer including a plurality of hidden nodes;
a plurality of first connection lines which connect the input nodes to the hidden nodes with first weights; and
a plurality of second connection lines which connect the hidden nodes to the output nodes with second weights.

15. The electronic device as claimed in claim 13, wherein the artificial neural network engine includes:
a learning module to make the object recognition model learn by using the learning data and the weights; and
a recognition module to apply the first sub feature vector and the weights to the learned object recognition model to provide the first object recognition result.

16. The electronic device as claimed in claim 15, wherein the learning module includes:
a model learning unit to determine the object recognition model that was learned by using the learning data and the weights;
a model storing unit to store the learned object recognition model; and
a model evaluation unit to evaluate the learned object recognition model based on an evaluation data.

17. An electronic device, comprising
an application processor to provide a learning data and weights, wherein the application processor is to provide a feature vector extracted from object data constituting an object;
a graphic processor including an artificial neural network engine to make an object recognition model learn by using the learning data and the weights to provide a learned object recognition model; and
a memory device to store the learning data, the weights, and the feature vector extracted from an input data received from the application processor, to provide the learning data and the weights to the graphic processor, to divide the feature vector into a first sub feature vector and a second sub feature vector, to provide the first sub feature vector to the graphic processor, to store the learned object recognition model from the graphic processor, and to perform a first calculation to apply the second sub feature vector and the weights to the learned object recognition model to provide a second object recognition result,
wherein the artificial neural network engine is to perform a second calculation to apply the first sub feature vector and the weights to the learned object recognition model to provide a first object recognition result, and to provide the first object recognition result to the memory device, the second calculation being performed in parallel with the first calculation.

18. The electronic device as claimed in claim 17, wherein the memory device includes:
a buffer die to communicate with the graphic processor and an external device;
a plurality of memory dies stacked on the buffer die; and
a plurality of through silicon vias (TSVs) extending through the plurality of memory dies to connect to the buffer die,
wherein each of the plurality of memory dies includes a memory cell array which includes a plurality of dynamic memory cells coupled to a plurality of word-lines and a plurality of bit-lines and the dynamic memory cells store the learning data, the weights and the feature vector, and
wherein the buffer die includes a processor-in-memory connected to the memory dies through the plurality of TSVs, and the processor-in-memory is to divide the feature vector into the first sub feature vector and the second sub feature vector and to perform the first calculation.

19. A method of operating an electronic device that includes a graphic processor including an artificial neural network engine, and a memory device communicating with the graphic processor, the method comprising:
making, in the artificial neural network engine, an object recognition model learn by applying learning data and weights to the object recognition model to provide a learned object recognition model;
dividing, by a data distributor in the memory device, a feature vector associated with an input data into a first sub feature vector and a second sub feature vector to provide the first sub feature vector to the graphic processor;
performing, by a multiplication and accumulation (MAC) circuit in the memory device, a first calculation to apply the second sub feature vector and the weights to the learned object recognition model to provide a second object recognition result; and performing, by the artificial neural network engine, a second calculation to apply the first sub feature vector and the weights to the learned object recognition model to provide a first object recognition result; and merging, by a pooler in the memory device, the first object recognition result and the second object recognition result to provide a merged object recognition result to a user, wherein the first calculation and the second calculation are performed in parallel with each other.

20. The method as claimed in claim 19, wherein the memory device includes:

a buffer die to communicate with the graphic processor and an external device;

a plurality of memory dies stacked on the buffer die; and a plurality of through silicon vias (TSVs) extending through the plurality of memory dies to connect to the buffer die, wherein each of the plurality of memory dies includes a memory cell array having a plurality of dynamic memory cells coupled to a plurality of word-lines and a plurality of bit-lines, the dynamic memory cells storing the learning data, the weights and the feature vector, and wherein the buffer die includes a processor-in-memory connected to the memory dies through the plurality of TSVs, and the processor-in-memory is to divide the feature vector into the first sub feature vector and the second sub feature vector, and to perform the first calculation.

* * * * *